(12) United States Patent
Xia et al.

(10) Patent No.: US 7,885,345 B2
(45) Date of Patent: Feb. 8, 2011

(54) PILOT ALLOCATION METHOD AND DEVICE OF ORTHOGONAL FREQUENCY DIVISION MULTIPLEXING SYSTEM

(75) Inventors: Shuqiang Xia, Guangdong Province (CN); Jiashi Lin, Guangdong Province (CN); Peng Zhang, Guangdong Province (CN); Guanghui Yu, Guangdong Province (CN)

(73) Assignee: ZTE Corporation, Shenzhen (CN)

( * ) Notice: Subject to any disclaimer, the term of this patent is extended or adjusted under 35 U.S.C. 154(b) by 913 days.

(21) Appl. No.: 11/792,650

(22) PCT Filed: Jun. 2, 2005

(86) PCT No.: PCT/CN2005/000770

§ 371 (c)(1),
(2), (4) Date: Jun. 8, 2007

(87) PCT Pub. No.: WO2006/060941

PCT Pub. Date: Jun. 15, 2006

(65) Prior Publication Data

US 2008/0075181 A1    Mar. 27, 2008

(30) Foreign Application Priority Data

Dec. 9, 2004    (CN) ................. 2004 1 0009976

(51) Int. Cl.
*H04L 27/28*    (2006.01)
(52) U.S. Cl. ....................... 375/260; 375/299
(58) Field of Classification Search ............. 375/260, 375/299, 267, 316; 370/203, 208, 329; 455/101
See application file for complete search history.

(56) References Cited

U.S. PATENT DOCUMENTS

2008/0039107 A1*  2/2008  Ma et al. ................. 455/450

(Continued)

FOREIGN PATENT DOCUMENTS

CN    1515093 A    7/2004

(Continued)

OTHER PUBLICATIONS

Roh et al, "Improved Data and Pilot Allocation for Cellular OFDMA Systems with Multiple Antennas", Samsung, Nortel Networks and Beceem Communications, IEEE C802.163-04/159r1, Jul. 2004.*

(Continued)

*Primary Examiner*—Chieh M Fan
*Assistant Examiner*—Aristocratis Fotakis

(57) ABSTRACT

The present invention relates to a pilot allocation method for an orthogonal frequency division multiplexing system, and the said method is used for a communication system which at least includes one transmitter and two transmitting antennas, characterized in including the following steps: step 1, a user data carrier allocating module in the transmitter allocating a data carrier for a user data symbol, then mapping the user data to the allocated carrier, and finally, outputting the mapped user data to a inverse fourier transform module in the transmitter; step 2, at the same time with step 1, the pilot data carrier allocating module in the transmitter determining the allocation rule of the pilot data according to the subchannel allocation manner and the number of the transmitting antenna of the system, and allocating the pilot carriers for the pilot data, then mapping the pilot data to the allocated carriers, and finally, outputting the pilot data to the inverse fourier transform module. The present invention synthetically considers the question of practical application as well as reducing the floor effect.

11 Claims, 3 Drawing Sheets

U.S. PATENT DOCUMENTS

| | | | |
|---|---|---|---|
| 2008/0095223 A1* | 4/2008 | Tong et al. | 375/228 |
| 2008/0108310 A1* | 5/2008 | Tong et al. | 455/69 |
| 2008/0188192 A1* | 8/2008 | Chae et al. | 455/129 |
| 2009/0262845 A1* | 10/2009 | Park et al. | 375/260 |

FOREIGN PATENT DOCUMENTS

| | | |
|---|---|---|
| DE | 10162545 C1 | 7/2003 |
| KR | 2003070218 A | 8/2003 |

OTHER PUBLICATIONS

Yaniv et al, "Pilot Allocation in Downlink PUSC", IEEE C802.16e-04/371, Alvarion and Samsung Electronics, Aug. 24, 2004.*

Lindskog et al, "Modified Pilot Allocation for downlink STC PUSC", IEEE C802.16e-04/310, Aug. 18, 2004.*

Leiba et al, "Clarifications to sub-carrier to tile mapping in PUSC permutation", IEEE C802.16d-04/92.*

Yigal Leiba, Yossi Segal, Zion Hada and Itzik Kitroser, "Clarifications to sub-carrier to tile mapping in PUSC permutation", Runcom Ltd, IEEE C802.16d-04/92, Jul. 2004.*

International Search Report, PCT/CN2005/000770, dated Sep. 15, 2005.

* cited by examiner

US 7,885,345 B2

PILOT ALLOCATION METHOD AND DEVICE OF ORTHOGONAL FREQUENCY DIVISION MULTIPLEXING SYSTEM

CROSS REFERENCE TO RELATED APPLICATIONS OR PRIORITY CLAIM

This application is a national phase of International Application No. PCT/CN2005/000770 entitled "A Pilot Allocation Method And Device Of Orthogonal Frequency Division Multi-Plexing System", which was filed on Jun. 2, 2005, which was not published in English, and which claims priority of the Chinese Patent Application No. 200410009976.1 Dec. 9, 2004.

TECHNICAL FIELD

The present invention relates to digital communication field, and specially, relates to a pilot allocation method and device for an orthogonal frequency division multiplexing system using multiple transmitting antennas.

BACKGROUND ART

The space-time codes (STC) is a space-time two-dimensional coding technology of low complexity, and a sender adopts a manner of orthogonal coding to send signals in each antenna at the same time, thereby making full use of space and time diversities, and improving the transmitting efficiency of the system by times. But this coding solution can only be applied to a quasi-static flat fading channel, while in actual mobile communication environments, multi-path time delay is a basic characteristic of a channel model, and the fading is frequency selective, and the design of the space-time codes becomes a relatively complex problem. The orthogonal frequency division multiplexing (OFDM) technology divides a frequency-selective fading channel into multiple parallel and relevant flat fading channels, and permits the mutual overlapping of the frequency spectrums of each subchannel, therefore, the utilization efficiency of the frequency spectrum is greatly improved. As a result, it is drawing more and more attention to combine the STC technology with the OFDM-technology and fully play their advantages.

No matter the decoding of the STC or the demodulating of relevant OFDM systems, they needs to know the status information of a radio channel exactly, which then sets forth a higher requirement for the pilot allocation method of a transmitter. A good pilot allocation method assisted with a proper channel estimation algorithm can greatly improve the performance of the system, and fully play the advantages of the STC and the OFDM technologies. Whereas, an improper pilot allocation method may result in the floor effect, i.e., with the increasing of the signal to noise ratio, the bit error rate does not decrease, and this is fatal to the radio system.

In the "IEEE P802.16REVd-D5" protocol, when the sub-channel allocation mode is the FUSC (Full Usage of Sub-channels) and there are two transmitting antennas, the system allocates pilots according to the following rules: for an even symbol, the system allocates a variable pilot set 0 and a fixed pilot set 0 to an antenna 0, and allocate a variable pilot set 1 and a fixed pilot set 1 to an antenna 1; for an odd-symbol, the system allocates a variable pilot set 1 and a fixed pilot set 0 to the antenna 0, and allocates a variable pilot set 0 and a fixed pilot set 1 to the antenna 1. According to this allocation rule, the minimum interval between two pilot carriers is 12 carriers (without considering the fixed pilot sets). When the coherent bandwidth of an air channel is less than 12 carriers, the error of the channel estimation mainly is induced by the interpolation error, and this kind of error will not decrease with the increasing of the signal to noise ratio, thereby resulting in the appearance of the floor effect. What needs to be pointed out is that this phenomenon exists widely. For example, assume the bandwidth of the system is 20 MHz and the channel model (amended Stanford University Interim channel model-5) is the SUI-5 channel, then the coherent bandwidth of the air channel only has 7 carriers, as a result, when the user data passes the channel, there will be serious floor effect.

In the "IEEE P802.16REVd-D5" protocol, when the sub-channel allocation mode is the PUSC (Partial Usage of Sub-channels) and there are two transmitting antennas, the system allocates pilots according to the following rules: for an even symbol, the system allocates the zero carrier and the twelfth carrier in each cluster to the antenna 0 as pilot carriers, and allocates the first carrier and the thirteenth carrier in each cluster to the antenna 1 as pilot carriers; for an odd symbol, the system allocates no pilot carrier to the antenna 0 or the antenna 1. According to this allocation rule, the minimum interval between two pilot carriers is 12 carriers, and the floor effect described above still can not be avoided.

U.S. Pat. No. 6,298,035, entitled "Estimation of two propagation channel in OFDM", proposes a method for increasing pilot density, wherein usable pilot carriers are allocated to two transmitting antennas at the same time, and in order to ensure that pilots of the receiving end do not intervene with each other, it is required that the pilots transmitted by the antenna 0 are orthogonal to the pilots transmitted by the antenna 1. By adopting this method, in the circumstance that pilot carriers are not increased, the pilot density of the two transmitting antennas can be rendered the same with that of a single antenna, which actually also reduces the influence of the floor effect. But this method will increase the overheads of a receiver as conducting channel estimation or synchronization, and if the method is used, it needs to make a great change to the IEEE802.16 protocol. In other words, the method is not compatible easily with the IEEE 802.16 protocol.

In general, the existing pilot allocation method does not synthetically consider decreasing the floor effect and some practical problems in application, such as the overhead of a receiver as conducting channel estimation making use of pilots and the compatibility of the protocol, and these need to be considered and improved.

SUMMARY OF THE INVENTION

The technical problem the present invention aims to solve is to provide a pilot allocation method and device for an orthogonal frequency division multiplexing system, and solve the problem that the prior art does not synthetically consider the problem of practical application when considering reducing the floor effect.

In order to achieve the above purpose, the present invention provides a pilot allocation method for an orthogonal frequency division multiplexing system, and said method is used for a communication system which at least includes one transmitter and two transmitting antennas, characterized in including the following steps: step 1, a user data carrier allocating module in the transmitter allocating a data carrier to the data symbol of a user, then mapping the user data to the allocated carrier, and finally, outputting the mapped user data to the inverse fourier transform module of the transmitter; step 2, at the same time of step 1, a pilot data carrier allocating module in the transmitter determining the allocation rule of the pilot data according to the subchannel allocation manner and the number of the transmitting antennas of the system, and allocating pilot carriers for the pilot data, then mapping the pilot data to the allocated carriers, and finally, outputting the pilot data to the inverse fourier transform module.

The above pilot allocation method for an orthogonal frequency division multiplexing system, characterized in that, in step 2, in the circumstance that the subchannel allocation manner of the system is the manner of usage of all subchannels, through the manner of setting the carrier offsets of the variable pilot sets of the system, four groups of variable pilot sets numbered as 0, 1, $0^+$, $1^+$ are obtained, and in conjunction with two groups of fixed pilot sets of the system numbered as 0 and 1 and according to the number of the transmitting antennae, determine the pilot allocation of each transmitting antenna at each symbol, and the said method for determining pilot allocation is as follows: in a pilot allocation period, the pilot interval allocated to the pilot of each antenna is the same with the manner of usage of all subchannels in the mode of non-space-time code.

The above pilot allocation method for an orthogonal frequency division multiplexing system, characterized in setting the carrier offset relationship of said four groups of variable pilot sets as follows: the carrier offset of the variable pilot set $0^+$=half of the carrier offset of the variable pilot set 0; and the carrier offset of the variable pilot set $1^+$=half of the carrier offset of the variable pilot set 1.

The above pilot allocation method for an orthogonal frequency division multiplexing system, characterized in that, in the circumstance that the number of the transmitting antennae is two, the pilot allocation period includes four symbols numbered as symbol 0, symbol 1, symbol 2 and symbol 3, and the two antennae are numbered as antenna 0 and antenna 1, and the allocation rule of the said pilot data is as follows:

at symbol 0: allocating a variable pilot set 0 and a fixed pilot set 0 to an antenna 0, and allocating a variable pilot set 1 and a fixed pilot set 1 to an antenna 1;

at symbol 1: allocating a variable pilot set 1 and a fixed pilot set 0 to the antenna 0, and allocating a variable pilot set 0 and a fixed pilot set 1 to the antenna 1;

at symbol 2: allocating a variable pilot set $0^+$ and a fixed pilot set 0 to the antenna 0, and allocating a variable pilot set $1^+$ and a fixed pilot set 1 to the antenna 1; and at symbol 3: allocating a variable pilot set $1^+$ and a fixed pilot set 0 to the antenna 0, and allocating a variable pilot set $0^+$ and a fixed pilot set 1 to the antenna 1.

The above pilot allocation method for an orthogonal frequency division multiplexing system, characterized in that, in the circumstance that the number of the transmitting antennas is four, the pilot allocation period includes eight symbols numbered as symbol 0 to symbol 7, and the four antennae are numbered as antenna 0 to antenna 3, and the allocation rule of the said pilot data is as follows:

at symbol 0: allocating a variable pilot set 0 and a fixed pilot set 0 to the antenna 0, and allocating a variable pilot set 1 and a fixed pilot set 1 to an antenna 1, and no pilot being allocated to the antenna 2 and the antenna 3;

at symbol 1: allocating a variable pilot set 0 and a fixed pilot set 0 to the antenna 2, and allocating a variable pilot set 1 and a fixed pilot set 1 to the antenna 3, and no pilot being allocated to the antenna 0 and the antenna 1;

at symbol 2: allocating a variable pilot set 1 and a fixed pilot set 0 to the antenna 0, and allocating a variable pilot set 0 and a fixed pilot set 1 to the antenna 1, and no pilot being allocated to the antenna 2 and the antenna 3;

at symbol 3: allocating a variable pilot set 1 and a fixed pilot set 0 to the antenna 2, and allocating a variable pilot set 0 and a fixed pilot set 1 to the antenna 3, and no pilot being allocated to the antenna 0 and the antenna 1;

at symbol 4: allocating a variable pilot set $0^+$ and a fixed pilot set 0 to the antenna 0, and allocating a variable pilot set $1^+$ and a fixed pilot set 1 to the antenna 1, and no pilot being allocated to the antenna 2 and the antenna 3;

at symbol 5: allocating a variable pilot set $0^+$ and a fixed pilot set 0 to the antenna 2, and allocating a variable pilot set $1^+$ and a fixed pilot set 1 to the antenna 3, and no pilot being allocated to the antenna 0 and the antenna 1;

at symbol 6: allocating a variable pilot set $1^+$ and a fixed pilot set 0 to the antenna 0, and allocating a variable pilot set $0^+$ and a fixed pilot set 1 to the antenna 1, and no pilot being allocated to the antenna 2 and the antenna 3; and at symbol 7: allocating a variable pilot set $1^+$ and a fixed pilot set 0 to the antenna 2, and allocating a variable pilot set $0^+$ and a fixed pilot set 1 to the antenna 3, and no pilot being allocated to the antenna 0 and the antenna 1.

The above pilot allocation method for an orthogonal frequency division multiplexing system, characterized in that, in step 2, in the circumstance that the subchannel allocation manner of the system is the manner of usage of a part of subchannels, allocate pilots to each antenna with cluster as the unit, and in a same pilot allocation period, the pilot interval of pilots allocated to each antenna is the same with the manner of usage of a part of subchannels in the mode of non-space-time code.

The above pilot allocation method for an orthogonal frequency division multiplexing system, characterized in that, in the circumstance that the number of the transmitting antennae is two, the pilot allocation period includes four symbols numbered as symbol 0, symbol 1, symbol 2 and symbol 3, and the two antennae are numbered as antenna 0 and antenna 1, and the allocation rule of the said pilot data is that the four symbols of the said pilot allocation period respectively choose a configuration mode which is not repetitive from the following configuration modes:

configuration mode A: allocating the fourth carrier and the eighth carrier of each cluster to the antenna 0, and no pilot carrier being allocated to the antenna 1, but prescribing that the antenna 1 will not send any data in the fourth carrier and the eighth carrier of each cluster;

configuration mode B: allocating the zero carrier and the twelfth carrier of each cluster to the antenna 1, and no pilot carrier being allocated to the antenna 0, but prescribing that the antenna 0 will not send any data in the zero carrier and the twelfth carrier of each cluster;

configuration mode C: allocating the zero carrier and the twelfth carrier of each cluster to the antenna 0, and no pilot carrier being allocated to the antenna 1, but prescribing that the antenna 1 will not send any data in the zero carrier and the twelfth carrier of each cluster; and configuration mode D: allocating the fourth carrier and the eighth carrier of each cluster to the antenna 1, and no pilot carrier being allocated to the antenna 0, but prescribing that the antenna 0 will not send any data in the fourth carrier and the eighth carrier of each cluster.

The above pilot allocation method for an orthogonal frequency division multiplexing system, characterized in that corresponding relationship between the four symbols of the pilot allocation period and the choice of the configuration modes is as follows:

at symbol 0, choosing configuration mode A;
at symbol 1, choosing configuration mode B;
at symbol 2, choosing configuration mode C; and
at symbol 3, choosing configuration mode D.

The above pilot allocation method for an orthogonal frequency division multiplexing system, characterized in that the corresponding relationship between the four symbols of the pilot allocation period and the choice of the configuration modes is as follows:
- at symbol 0, choosing configuration mode A;
- at symbol 1, choosing configuration mode B;
- at symbol 2, choosing configuration mode D; and
- at symbol 3, choosing configuration mode C.

The above pilot allocation method for an orthogonal frequency division multiplexing system, characterized in that the corresponding relationship between the four symbols of the pilot allocation period and the choice of the configuration modes is as follows:
- at symbol 0, choosing configuration mode A;
- at symbol 1, choosing configuration mode D;
- at symbol 2, choosing configuration mode C; and
- at symbol 3, choosing configuration mode B.

The above pilot allocation method for an orthogonal frequency division multiplexing system, characterized in that corresponding relationship between the four symbols of the pilot allocation period and the choice of the configuration mode as follows:
- at symbol 0, choosing configuration mode C;
- at symbol 1, choosing configuration mode B;
- at symbol 2, choosing configuration mode A; and
- at symbol 3, choosing configuration mode D.

In order to better achieve the purpose of the present invention, the present invention further provides a pilot allocating device for an orthogonal frequency division multiplexing system, characterized in including: an inverse fourier transform module and a user data carrier allocating module and a pilot data carrier allocating module respectively connected to the said inverse fourier transform module; the said user data carrier allocating module being used for allocating a data carrier to a data symbol of the user, then mapping the data to an allocated carrier, and finally, outputting the user data to the inverse fourier transform module of the transmitter; the said pilot data carrier allocating module being used for determining the allocation rule of the pilot data according to the subchannel allocation manner and the number of the transmitting antennas of the system, and allocating a pilot carrier to the pilot data, then mapping the pilot data to the allocated carrier, and finally, outputting the pilot data to the inverse fourier transform module.

The technical effect of the present invention lies in that through adopting the method according to the present invention, the influence of floor effect upon the performance of the system can be reduced without increasing additional pilot carriers, and the method is realized after coding and modulating, it can be easily compatible with the circumstance that there is only one antenna, thereby simplifying the design of the transmitter. Meanwhile, adopting the method according to the present invention, it is easier for the receiver to realize channel estimation using the pilots than the U.S. Pat. No. 6,298,035 does, thereby simplifying the realization of the receiver.

The following is a further detailed description of the specific embodiment of the present invention in conjunction with the accompanying drawings.

BRIEF DESCRIPTION OF THE ACCOMPANYING DRAWINGS

EMBODIMENTS FOR CARRYING OUT THE PRESENT INVENTION

According to the present invention, when the transmitter adopts multiple antennae to transmit data, it arranges the pilots reasonably, thus the influence of the floor effect is reduced effectively, and meanwhile, it also considers the problems of practical application.

Figure 6:
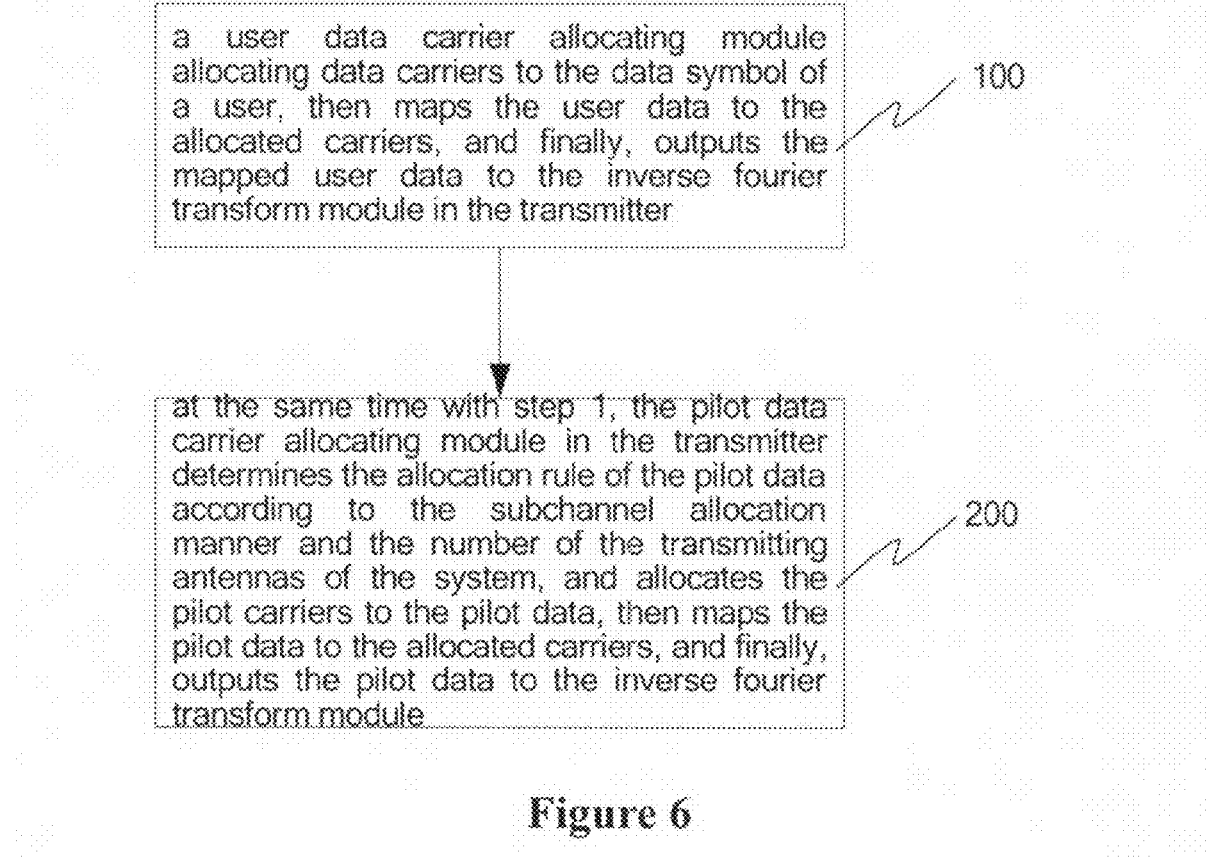
FIG. 6 is a flowchart illustrating step according to the present invention.

The present invention provides a pilot allocation method for the OFDM communication system, and the communication system at least comprises a transmitter and two transmitting antennas, referring to FIG. 6, it is a flowchart of the step according to the method of the present invention, and the method comprises the following steps:

step 100, in the transmitter, the user data carrier allocating module allocating a data carrier to a user data symbol, then mapping the data to the allocated carrier, and finally, outputting the user data to the inverse fourier transform module in the transmitter; and step 200, at the same time with step 100, the pilot data carrier allocating module determining the allocation rule of the pilot data according to the subchannel allocation manner and the number of the transmitting antennas of the system, and allocating a pilot carrier to a pilot data, then mapping the pilot data to the allocated carrier, and finally, outputting the pilot data to the inverse fourier transform module.

Figure 1:
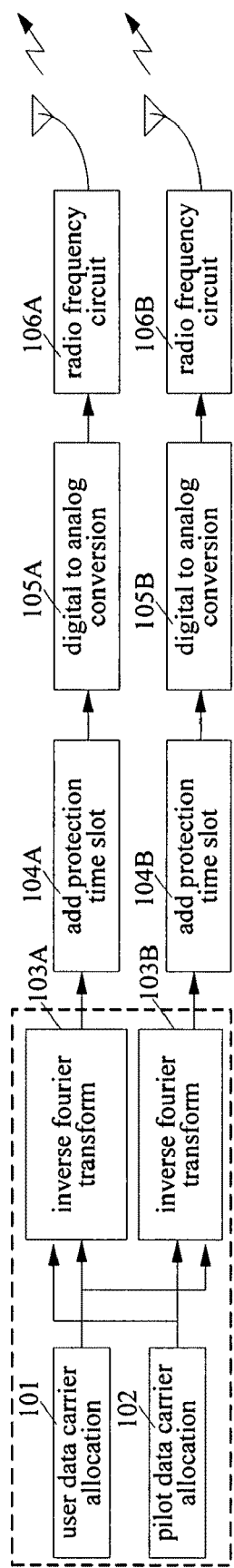
FIG. 1 is a schematic view of a transmitter including a simplified OFDM system according to the present invention.

The following shows a specific embodiment of the present invention. FIG. 1 is a schematic view showing a transmitter of a simplified OFDM system of the present invention, and the transmitter includes two antennas. According to the factors such as the application of a user and usable resources of the system, the user data carrier allocating module 101 allocates the user data to different carriers, finally, outputs the user data to the inverse fourier transform modules 103A and 103B in a certain order. Please be noted that the user data here generally have been coded and modulated. Meanwhile, the pilot data carrier allocating module 102 determines the allocation rule of the pilot data according to the subchannel allocation manner and the number of the transmitting antennas of the system, allocates pilot carriers to pilot data, then maps the pilot data to the allocated carriers and outputs the pilot data to the inverse fourier transform modules 103A and 103B. The inverse fourier transform modules 103A and 103B implement inverse fourier transform to the input data, thus transforming the data of the parallel frequency domains into serial time domain data and outputs them. Protection time slot adding modules 104A and 104B respectively add protection time slot to the data output from the inverse fourier transform modules 103A and 103B, which aims to eliminate the interference among the symbols and keep the orthogonality between the carriers. The data model converting modules 105A and 105B convert the discrete data output by the protection time slot adding modules 104A and 104B into analog data. The radio frequency circuit modules 106A and 106B process the analog data of the data model converting modules 105A and 105B properly and finally output them to the air channels.

In consideration of reducing the influence of the floor effect, the realization of channel estimation by the receiver using the pilots and the compatibility with existing IEEE 802.16 protocol etc., in a pilot allocation period, the pilot interval allocated to the pilot carrier of each antenna is the same with that in the non STC mode.

When the subchannel allocation mode is FUSC and there are two transmitting antennas, the pilot allocation rule of the pilot data carrier allocation modules 102 is shown in the following table 1:

TABLE 1

| symbol index | antenna 0 | antenna 1 |
|---|---|---|
| symbol 0 | variable pilot set 0 and fixed pilot set 0 | variable pilot set 1 and fixed pilot set 1 |
| symbol 1 | variable pilot set 1 and fixed pilot set 0 | variable pilot set 0 and fixed pilot set 1 |

TABLE 1-continued

| symbol index | antenna 0 | antenna 1 |
|---|---|---|
| symbol 2 | variable pilot set $0^+$ and fixed pilot set 0 | variable pilot set $1^+$ and fixed pilot set 1 |
| symbol 3 | variable pilot set $1^+$ and fixed pilot set 0 | variable pilot set $0^+$ and fixed pilot set 1 |

From the table it can be seen that the pilot allocation takes four symbols as a period:

at symbol 0: allocating a variable pilot set 0 and a fixed pilot set 0 to the antenna 0, and allocating a variable pilot set 1 and a fixed pilot set 1 to the antenna 1;

at symbol 1: allocating a variable pilot set 1 and a fixed pilot set 0 to the antenna 0, and allocating a variable pilot set 0 and a fixed pilot set 1 to the antenna 1;

at symbol 2: allocating a variable pilot set $0^+$ and a fixed pilot set 0 to the antenna 0, and allocating a variable pilot set $1^+$ and a fixed pilot set 1 to the antenna 1; and at symbol 3: allocating a variable pilot set $1^+$ and a fixed pilot set 0 to the antenna 0, and allocating a variable pilot set $0^+$ and a fixed pilot set 1 to the antenna 1.

In synthetic consideration of the influence of the floor effect, the realization of channel estimation by the receiver using the pilots and the compatibility with existing IEEE 802.16 protocol, the pilot interval of the existing protocol IEEE 802.16 in the FUSC mode is 12, here we prescribe:

the carrier offset of the variable pilot set $0^+$=the carrier offset of the variable pilot set 0+6; (1)

the carrier offset of the variable pilot set $1^+$=the carrier offset of the variable pilot set 1+6. (2)

What needs to be pointed out is that our method can be extended to four or more transmitting antennas, when the subchannel allocation mode is the FUSC and there are four transmitting antennas, the pilot allocation rule of the pilot data carrier allocation module 102 is shown in the following table, and there is no need to describe the specific process again.

TABLE 2

| symbol index | antenna 0 | antenna 1 | antenna 2 | antenna 3 |
|---|---|---|---|---|
| symbol 0 | variable pilot set 0 and fixed pilot set 0 | variable pilot set 1 and fixed pilot set 1 | no pilot is allocated | no pilot is allocated |
| symbol 1 | no pilot is allocated | no pilot is allocated | variable pilot set 0 and fixed pilot set 0 | variable pilot set 1 and fixed pilot set 1 |
| symbol 2 | variable pilot set 1 and fixed pilot set 0 | variable pilot set 0 and fixed pilot set 1 | no pilot is allocated | no pilot is allocated |
| symbol 3 | no pilot is allocated | no pilot is allocated | variable pilot set 1 and fixed pilot set 0 | variable pilot set 0 and fixed pilot set 1 |
| symbol 4 | variable pilot set $0^+$ and fixed pilot set 0 | variable pilot set $1^+$ and fixed pilot set 1 | no pilot is allocated | no pilot is allocated |
| symbol 5 | no pilot is allocated | no pilot is allocated | variable pilot set $0^+$ and fixed pilot set 0 | variable pilot set $1^+$ and fixed pilot set 1 |
| symbol 6 | variable pilot set $1^+$ and fixed pilot set 0 | variable pilot set $0^+$ and fixed pilot set 1 | no pilot is allocated | no pilot is allocated |
| symbol 7 | no pilot is allocated | no pilot is allocated | variable pilot set $1^+$ and fixed pilot set 0 | variable pilot set $0^+$ and fixed pilot set 1 |

Figure 2:
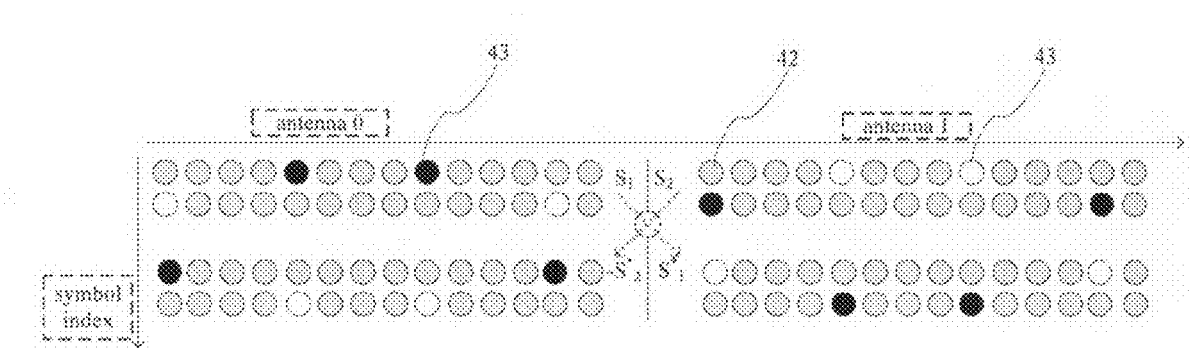
FIG. 2 is a schematic view illustrating pilot allocation when the subchannel allocation mode is PUSC, and there two transmitting antennae.

FIG. 2 is a schematic view, wherein the subchannel allocation mode is PUSC and there are two transmitting antennas. Wherein the black circles represent the pilot carrier 41, the grey circles represents the data carrier 42, and the white circles represent the null carrier 43, i.e., the null carrier does not send any data. From FIG. 2 it can be seen that the pilot allocation takes four symbols as a period:

at symbol 0: allocating the fourth carrier and the eighth carrier of each cluster to the antenna 0, and no pilot carrier being allocated to the antenna 1, but prescribing that the antenna 1 will not send any data at the fourth carrier and the eighth carrier of each cluster;

at symbol 1: allocating the zero carrier and the twelfth carrier of each cluster to the antenna 1, and no pilot carrier being allocated to the antenna 0, but prescribing that the antenna 0 will not send any data at the zero carrier and the twelfth carrier of each cluster;

at symbol 2: allocating the zero carrier and the twelfth carrier of each cluster to the antenna 0, and no pilot carrier being allocated to the antenna 1, but prescribing that the antenna 1 will not send any data at the zero carrier and the twelfth carrier of each cluster; and at symbol 3: allocating the fourth carrier and the eighth carrier of each cluster to the antenna 1, and no pilot carrier being allocated to the antenna 0, but prescribing that the antenna 0 will not send any data at the fourth carrier and the eighth carrier of each cluster.

Figure 3:
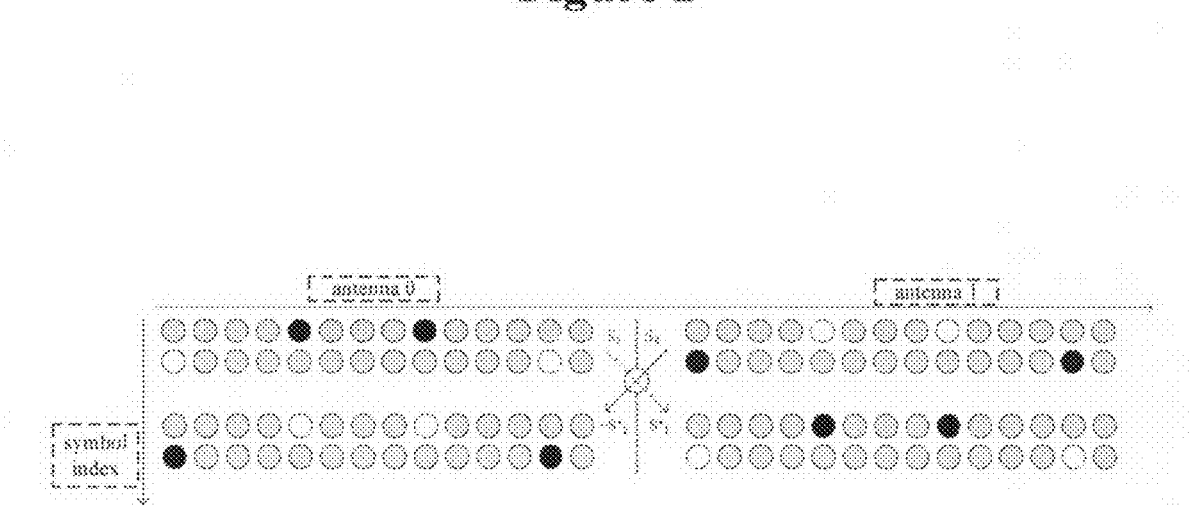
FIGS. 3, 4 and 5 are schematic views illustrating another three kinds of pilot allocation when the subchannel allocation mode is PUSC, and there are two transmitting antennas.

FIG. 3 is a schematic view illustrating a second kind of pilot allocation when the subchannel allocation mode is PUSC and there are two transmitting antennas. Wherein the black circles represent the pilot carrier 41, the grey circles represent the data carrier 42, and the white circles represent the null carrier 43, i.e., the null carrier does not send any data. From FIG. 3 it can be seen that pilot allocation takes four symbols as a period:

at symbol 0: allocating the fourth carrier and the eighth carrier of each cluster to the antenna 0, and no pilot carrier being allocated to the antenna 1, but prescribing that the antenna 1 will not send any data at the fourth carrier and the eighth carrier of each cluster;

at symbol 1: allocating the zero carrier and the twelfth carrier of each cluster to the antenna 1, and no pilot carrier being allocated to the antenna 0, but prescribing that antenna 0 will not send any data at the zero carrier and the twelfth carrier of each cluster;

at symbol 2: allocating the fourth carrier and the eighth carrier of each cluster to the antenna 1, and no pilot carrier being allocated to the antenna 0, but prescribing that the antenna 0 will not send any data at the fourth carrier and the eighth carrier of each cluster; and at symbol 3: allocating the zero carrier and the twelfth carrier of each cluster to the antenna 0, and no pilot carrier being allocated to the antenna 1, but prescribing that the antenna 1 will not send any data at the zero carrier and the twelfth carrier of each cluster.

Figure 4:
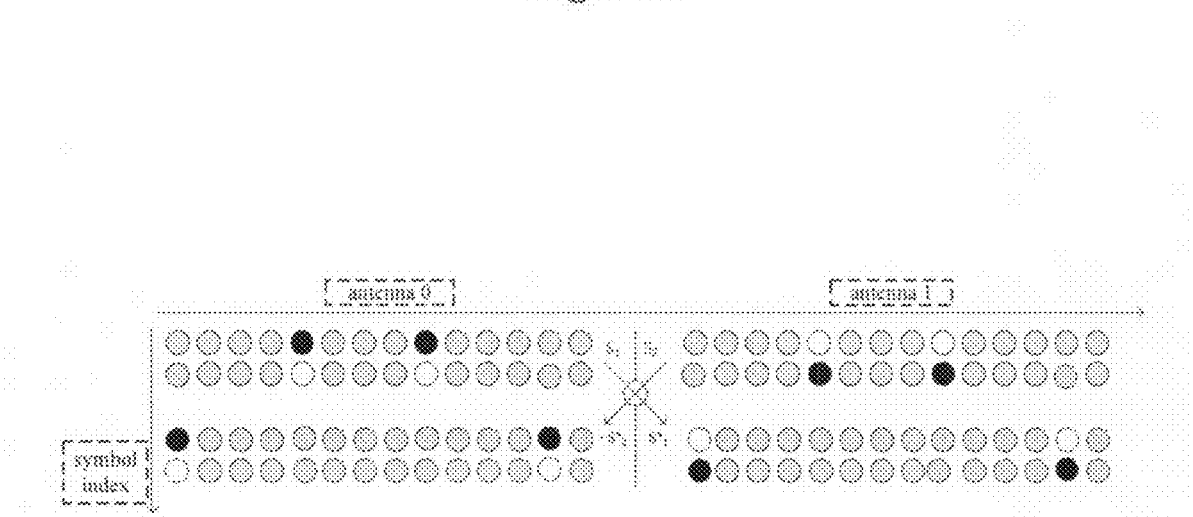

FIG. 4 is a schematic view illustrating a third kind of pilot allocation when the subchannel allocation mode is the PUSC and there are two transmitting antennas. Wherein the black circles represent the pilot carrier 41, the grey circles represent the data carrier 42, and the white circles represent the null carrier 43, i.e., the null carrier does not send any data. From FIG. 4 it can be seen that the pilot allocation takes four symbols as a period:

at symbol 0: allocating the fourth carrier and the eighth carrier of each cluster to the antenna 0, and no pilot carrier being allocated to the antenna 1, but prescribing that the antenna 1 will not send any data at the fourth carrier and the eighth carrier of each cluster;

at symbol 1: allocating the fourth carrier and the eighth carrier of each cluster to the antenna 1, and no pilot carrier being allocated to the antenna 0, but prescribing that the antenna 0 will not send any data at the fourth carrier and the eighth carrier of each cluster;

at symbol 2: allocating the zero carrier and the twelfth carrier of each cluster to the antenna 0, and no pilot carrier being allocated to the antenna 1, but prescribing that the antenna 1 will not send any data at the zero carrier and the twelfth carrier of each cluster; and at symbol 3: allocating the zero carrier and the twelfth carrier of each cluster to the antenna 1, and no pilot carrier being allocated to the antenna 0, but prescribing that the antenna 0 will not send any data at the zero carrier and the twelfth carrier of each cluster.

Figure 5:
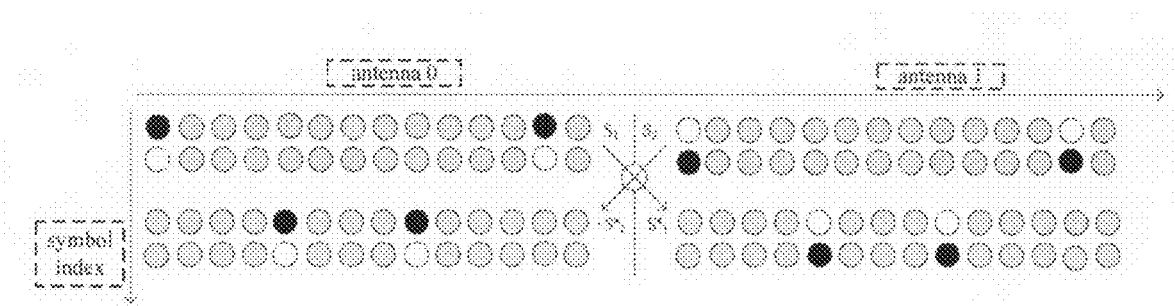

FIG. 5 is a schematic view illustrating a fourth kind of pilot allocation when the subchannel allocation mode is the PUSC and there are two transmitting antennas. Wherein the black circles represent the pilot carrier 41, the grey circles represent the data carrier 42, and the white circles represent the null carrier 43, i.e., the null carrier does not send any data. From FIG. 5 it can be seen that the pilot allocation takes four symbols as a period:

at symbol 0: allocating the zero carrier and the twelfth carrier of each cluster to the antenna 0, and no pilot carrier being allocated to the antenna 1, but prescribing that the antenna 1 will not send any data at the zero carrier and the twelfth carrier of each cluster;

at symbol 1: allocating the zero carrier and the twelfth carrier of each cluster to the antenna 1, and no pilot carrier being allocated to the antenna 0, but prescribing that the antenna 0 will not send any data at the zero carrier and the twelfth carrier of each cluster;

at symbol 2: allocating the fourth carrier and the eighth carrier of each cluster to the antenna 0, and no pilot carrier being allocated to the antenna 1, but prescribing that the antenna 1 will not send any data at the fourth carrier and the eighth carrier of each cluster; and at symbol 3: allocating the fourth carrier and the eighth carrier of each cluster to the antenna 1, and no pilot carrier being allocated to the antenna 0, but prescribing that the antenna 0 will not send any data at the fourth carrier and the eighth carrier of each cluster.

Through the principles of FIG. 2, FIG. 3, FIG. 4 and FIG. 5, it will be understood by those of ordinary skill in the art that our method can be easily extended to the circumstance of four or more antennas in the PUSC mode. Therefore, it is to be understood that the above-described embodiments have been provided only in a descriptive sense and will not be construed as placing any limitation on the scope of the invention. The changes and modifications which can be made according to the present invention fall in the range required by Claims.

INDUSTRIAL APPLICABILITY

According to the method of the present invention, the influence of the floor effect upon the performance of the system can be reduced without adding additional pilot carriers, and the method is realized after the coding and modulating, it can be easily compatible with the circumstance that there is only one antenna, thereby simplifying the design of the transmitter. Meanwhile, through adopting the method according to the present invention, it is easier for the receiver to realize the channel estimation by using the pilot than the U.S. Pat. No. 6,298,035 does, thereby simplifying the realization of the receiver. The pilot allocation method of the present invention can be applied when the orthogonal frequency division multiplexing system uses multiple transmitting antennae in the data communication field, and it can also be applied to other fields which have the similar problems.

What is claimed is:

1. A pilot allocation method for an orthogonal frequency division multiplexing system, used for the communication system which at least including one transmitter and two transmitting antennas, including the following steps:

step 1, a user data carrier allocating module in the transmitter allocating data carriers to a data symbol of a user, then mapping user data to the allocated carriers, and finally, outputting the mapped user data to an inverse fourier transform module in the transmitter; and step 2, at the same time with step 1, a pilot data carrier allocating module in the transmitter determining the allocation rule of pilot data according to the subchannel allocation manner and the number of the transmitting antennas of the system, and allocating pilot carriers to the pilot data, then mapping the pilot data to the allocated carriers, and finally, outputting the pilot data to the inverse Fourier transform module, wherein, in step 2, in the circumstance that the subchannel allocation manner of the system is usage of all subchannels, through the manner of setting the carrier offsets of the variable pilot sets of the system, obtaining four groups of variable pilot sets numbered as 0, 1, 0+, 1+, and in conjunction with two groups of the fixed pilot sets of the system numbered as 0 and 1 and according to the number of the transmitting antennas, determining the pilot allocation of each transmitting antenna to each symbol, and the determining method for pilot allocation being as follows: in a pilot allocation period, the pilot interval of the pilots allocated to each antenna is the same with that of the usage of all subchannels in a mode of non-space-time code.

2. The pilot allocation method for an orthogonal frequency division multiplexing system according to claim 1, characterized in setting the carrier offset relationship of said four groups of variable pilot sets are as follows:

the carrier offset of a variable pilot set 0+=half of the carrier offset of a variable pilot set 0; and the carrier offset of a variable pilot set 1+=half of the carrier offset of a variable pilot set 1.

3. The pilot allocation method for an orthogonal frequency division multiplexing system according to claim 2, wherein in the circumstance that the number of the transmitting antennas is two, the pilots allocation period includes four symbols numbered as symbol 0, symbol 1, symbol 2 and symbol 3, and the two antennas are numbered as antenna 0 and antenna 1, and the allocation rule of the pilot data is as follows:

at symbol 0: allocating the variable pilot set 0 and the fixed pilot set 0 to the antenna 0, and allocating the variable pilot set 1 and the fixed pilot set 1 to the antenna 1;

at symbol 1: allocating the variable pilot set 1 and the fixed pilot set 0 to the antenna 0, and allocating the variable pilot set 0 and the fixed pilot set 1 to the antenna 1;

at symbol 2: allocating the variable pilot set 0+ and the fixed pilot set 0 to the antenna 0, and allocating the variable pilot set 1+ and the fixed pilot set 1 to the antenna 1; and at symbol 3: allocating the variable pilot set 1+ and the fixed pilot set 0 to the antenna 0, and allocating the variable pilot set 0+ and the nixed pilot set 1 to the antenna 1.

4. The pilot allocation method for an orthogonal frequency division multiplexing system according to claim 2, wherein in the circumstance that the number of the transmitting antennas is four, the pilot allocation period includes eight symbols numbered as symbol 0 to symbol 7, and the four antennas are numbered as antenna 0 to antenna 3, and the allocation rule of the pilot data is as follows:

at symbol 0: allocating the variable pilot set 0 and the fixed pilot set 0 to the antenna 0, and allocating the variable pilot set 1 and the fixed pilot set 1 to the antenna 1, and no pilot being allocated to the antenna 2 and the antenna 3;

at symbol 1: allocating the variable pilot set 0 and the fixed pilot set 0 to the antenna 2, and allocating the variable pilot set 1 and the fixed pilot set 1 to the antenna 3, and no pilot being allocated to the antenna 0 and the antenna 1;

at symbol 2: allocating the variable pilot set 1 and the fixed pilot set 0 to the antenna 0, and allocating the variable pilot set 0 and the fixed pilot set 1 to the antenna 1, and no pilot being allocated to the antenna 2 and the antenna 3;

at symbol 3: allocating the variable pilot set 1 and the fixed pilot set 0 to the antenna 2, and allocating the variable pilot set 0 and the fixed pilot set 1 to the antenna 3, and no pilot being allocated to the antenna 0 and the antenna 1;

at symbol 4: allocating the variable pilot set 0+ and the fixed pilot set 0 to the antenna 0, and allocating the variable pilot set 1+ and the fixed pilot set 1 to the antenna 1, and no pilot being allocated to the antenna 2 and the antenna 3;

at symbol 5: allocating the variable pilot set 0+ and the fixed pilot set 0 to the antenna 2, and allocating the variable pilot set 1+ and the fixed pilot set 1 to the antenna 3, and no pilot being allocated to the antenna 0 and the antenna 1;

at symbol 6: allocating the variable pilot set 1+ and the fixed pilot set 0 to the antenna 0, and allocating the variable pilot set 0+ and the fixed pilot set 1 to the antenna 1, and no pilot being allocated to the antenna 2 and the antenna 3; and at symbol 7: allocating the variable pilot set 1+ and the fixed pilot set 0 to the antenna 2, and allocating the variable pilot set 0+ and the fixed pilot set 1 to the antenna 3, and no pilot being allocated to the antenna 0 and the antenna 1.

5. The pilot allocation method for an orthogonal frequency division multiplexing system according to claim 1, wherein in step 2, in the circumstance that the subchannel allocation manner of the system is usage of a part of subchannels, allocate pilots to each antenna in a unit of cluster, and in a pilot allocation period, the pilot interval of pilots allocated to each antenna is the same with that of usage of a part of subchannels in the mode of non-space-time code.

6. The pilot allocation method for an orthogonal frequency division multiplexing system according to claim 5, wherein in the circumstance that the number of the transmitting antennae is two, the pilot allocation period includes four symbols numbered as symbol 0, symbol 1, symbol 2 and symbol 3, and the two antennas are numbered as antenna 0 and antenna 1, and the allocation rule of the pilot data is that the four symbols of the pilot allocation period respectively choose a non repetitive configuration mode from the following configuration modes:

configuration mode A: allocating the fourth carrier and the eighth carrier of each cluster to the antenna 0, and no pilot carrier being allocated to the antenna 1, but prescribing that the antenna 1 will not send any data at the fourth carrier and the eighth carrier of each cluster;

configuration mode B: allocating the zero carrier and the twelfth carrier of each cluster to the antenna 1, and no pilot carrier being allocated to the antenna 0, but prescribing that the antenna 0 will not send any data at the zero carrier and the twelfth carrier of each cluster;

configuration mode C: allocating the zero carrier and the twelfth carrier of each cluster to the antenna 0, and no pilot carrier being allocated to the antenna 1, but prescribing that the antenna 1 will not send any data at the zero carrier and the twelfth carrier of each cluster; and configuration mode D: allocating the fourth carrier and the eighth carrier of each cluster to the antenna 1, and no pilot carrier being allocated to the antenna 0, but prescribing that the antenna 0 will not send any data at the fourth carrier and the eighth carrier of each cluster.

7. The pilot allocation method for an orthogonal frequency division multiplexing system according to claim 6, wherein the corresponding relationship between the four symbols of the pilot allocation period and the choice of the configuration modes is as follows:

at symbol 0, choosing configuration mode A;
at symbol 1, choosing configuration mode B;
at symbol 2, choosing configuration mode C; and
at symbol 3, choosing configuration mode D.

8. The pilot allocation method for an orthogonal frequency division multiplexing system according to claim 6, wherein the corresponding relationship between the four symbols of the pilot allocation period and the configuration modes is as follows:

at symbol 0, choosing configuration mode A;
at symbol 1, choosing configuration mode B;
at symbol 2, choosing configuration mode D; and
at symbol 3, choosing configuration mode C.

9. The pilot allocation method for an orthogonal frequency division multiplexing system according to claim 6, wherein the corresponding relationship between the four symbols of the pilot allocation period and the configuration modes is as follows:

at symbol 0, choosing configuration mode A;
at symbol 1, choosing configuration mode D;
at symbol 2, choosing configuration mode C; and
at symbol 3, choosing configuration mode B.

10. The pilot allocation method for an orthogonal frequency division multiplexing system according to claim 6, wherein the relationship between the four symbols of the pilot allocation period and the configuration modes is as follows:

in symbol 0, choosing configuration mode C;
in symbol 1, choosing configuration mode B;
in symbol 2, choosing configuration mode A; and
in symbol 3, choosing configuration mode D.

11. A pilot allocating device adopting the method according to claim 1 including:

an inverse fourier transform module, a user data carrier allocating module and a pilot data carrier allocating module connected to the inverse fourier transform module respectively;

the user data carrier allocating module being used for allocating data carriers to the data symbol of a user, then mapping data to the allocated carriers, and finally, outputting the user data to the inverse fourier transform module of the transmitter; and the pilot data carrier allocating module being used for determining the allocation rule of pilot data according to the subchannel allocation manner and the number of the transmitting antennas of the system, and allocating pilot carriers to pilot data, then mapping the pilot data to the allocated carriers, and finally, outputting the pilot data to the inverse Fourier transform module.

* * * * *